United States Patent [19]
Schick

[11] Patent Number: 5,368,214
[45] Date of Patent: Nov. 29, 1994

[54] APPARATUS FOR STAPLING SPLICE CLIPS TO A BELT END

[75] Inventor: Jean-Francois Schick, Saint Privat des Vieux, France

[73] Assignee: Goro S.A., Saint Privat des Vieux, France

[21] Appl. No.: 989,807

[22] Filed: Dec. 11, 1992

[30] Foreign Application Priority Data

Dec. 11, 1991 [DE] Germany .................. 4140743

[51] Int. Cl.$^5$ ............................................. B27F 7/19
[52] U.S. Cl. ........................................ 227/147; 227/155; 29/243.51
[58] Field of Search .............. 227/20, 26, 31, 32, 227/33, 34, 43, 110, 111, 154, 155, 156, 901, 147; 29/243.51, 243.56

[56] References Cited

U.S. PATENT DOCUMENTS

| | | | |
|---|---|---|---|
| 4,050,138 | 9/1977 | Stolz | 29/243.51 |
| 4,144,628 | 3/1979 | Schick | 29/243.51 |
| 4,538,755 | 9/1985 | Schick | 29/243.51 X |
| 4,620,657 | 11/1986 | Gladding et al. | 29/243.51 X |
| 4,688,711 | 8/1987 | Gladding et al. | 29/243.51 X |
| 5,025,968 | 6/1991 | Nasiatka | 227/31 X |
| 5,095,590 | 3/1992 | Schick | 24/33 B |
| 5,170,924 | 12/1992 | Musil | 29/243.51 X |

FOREIGN PATENT DOCUMENTS

| | | | |
|---|---|---|---|
| 125500 | 7/1947 | Australia | 29/243.51 |
| 571613 | 2/1924 | France | 29/243.51 |

Primary Examiner—Rinaldi I. Rada
Assistant Examiner—Clark F. Dexter
Attorney, Agent, or Firm—Herbert Dubno; Andrew Wilford

[57] ABSTRACT

A U-shaped clip has a pair of legs each formed with two holes and with a rearwardly open notch and a bight joining the legs. A stapling apparatus has a die part having a seat shaped to fit one of the bights and having an upstanding guide web snugly engageable with the bight and a forwardly pointing centering wedge engageable in the notch. The apparatus also has a presser part displaceable toward and away from the die part and having a passage in which a staple engaged in the holes of the other leg fits complementarily, and a plunger displaceable toward and away from the die part in the passage of the presser part so that, when the clip is fitted over a belt end and to the die part, depression of the plunger forces the staple through the belt end and through both legs of the clip.

5 Claims, 7 Drawing Sheets 5,368,214

APPARATUS FOR STAPLING SPLICE CLIPS TO A BELT END

FIELD OF THE INVENTION

The present invention relates to fastening splice clips or connectors to a belt end. More particularly this invention concerns a device for stapling such clips to a belt end.

BACKGROUND OF THE INVENTION

In a manufacturing operation it is frequently necessary to make up or repair drive or conveyor belts. This procedure typically consists of joining two ends of a section of belting to form an endless belt. Such procedures are described in my copending application Ser. No. 07/758,877 (now U.S. Pat. No. 5,182,933) as well as in my U.S. Pat. No. 5,095,590.

As a rule a plurality of U-shaped clips, which may all be connected together, are stapled to each belt end so that they can be interleaved and a connecting pin can be slid through them. This forms the clips into a sort of hinge that solidly connects together the belt ends while still permitting it to flex.

Each such clip or connector typically is made of metal and has a pair of legs adapted to embrace the respective belt end and a bight portion interconnecting the outer ends of the legs. Each leg in turn is formed with at least two throughgoing holes that align with the holes of the leg on the opposite face of the belt, and staples are driven through the registering holes from one side of the belt and are crimped over on the other side.

The main problem is ensuring that the staples pass through the preformed holes in the legs of the connector clips. This is not a problem on the upper leg, as typically the staples are inserted in the holes of this leg manually before the clip is fitted to the apparatus that drives the staples through the belt and crimps them on the bottom side of the belt. The problem is ensuring that the staples actually do line up with and pass through the holes in the bottom connector-clip leg. Any slight misalignment and the job is ruined, as the staple will strike the clip and not pass through it, requiring that it be painstakingly pulled out and that another staple be driven through the belt end without following the hole made by the pulled-out staple.

The simplest solution is to make the holes in the bottom clip leg fairly large so that the chances of missing them are reduced. Such construction has of course the disadvantage that the staple fits loosely through this leg of the clip, weakening the connection. This is particularly problematic when the clip is made of light sheet metal.

OBJECTS OF THE INVENTION

It is therefore an object of the present invention to provide an improved apparatus for stapling connector clips to a belt end.

Another object is the provision of such an improved apparatus for stapling connector clips to a belt end which overcomes the above-given disadvantages, that is which ensures perfect positioning of the staple and clip so that the preformed staple holes in the clip can fit the staples snugly, ensuring a very solid mounting of the clip on the belt end.

SUMMARY OF THE INVENTION

The instant invention is used in combination with a U-shaped clip having a pair of legs each formed with at least two holes and with a rearwardly open notch, a bight joining the legs, and at least one staple having two prongs. The stapling apparatus according to the invention has a die part having a seat shaped to fit one of the bights and having an upstanding guide web snugly engageable with the bight and a forwardly pointing centering wedge engageable in the notch. The apparatus also has a presser part displaceable toward and away from the die part and having a passage in which a staple engaged in the holes of the other leg fits complementarily, and a plunger displaceable toward and away from the die part in the passage of the presser part so that, when the clip is fitted over a belt end and to the die part, depression of the plunger forces the staple through the belt end and through both legs of the clip.

With this system, therefore, the clip and staple are positioned perfectly so that when the plunger is depressed, the prongs of the staple will be forced perpendicularly through the belt end and through the holes in the lower clip leg. Since the alignment is always perfect, the holes in the lower clip leg can be dimensioned to receive the staple prongs snugly, ensuring a very solid connection of the clip to the belt end.

According to a further feature of the invention the die part has a plurality of such seats, webs, and wedges. The webs are formed with holes aligned with each other and with the bights of clips in the seats. The apparatus further has a centering pin engageable through the holes and between the legs of the clips at the bights thereof. The webs have edges forming a stop for the belt end. Thus a plurality of such clips can be fitted to the die part and the belt end is slid in to abut the web edges, then the clips are stapled in place one by one.

The clip has in accordance with another feature of the invention a bright having two bight portions defining a forwardly open space therebetween. The web fits complementarily into the space when the clip is fitted to the seat. Such a clip is normally made of folded or bent sheet metal.

In accordance with further features of the invention the die part is formed with at least one guide hole extending perpendicular to the seat. The presser part has a guide pin slidable in the bore. Furthermore the presser part has a lower surface formed with a shoulder complementarily engageable with a rear edge of the other leg of a clip fitted in the seat of the die part.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
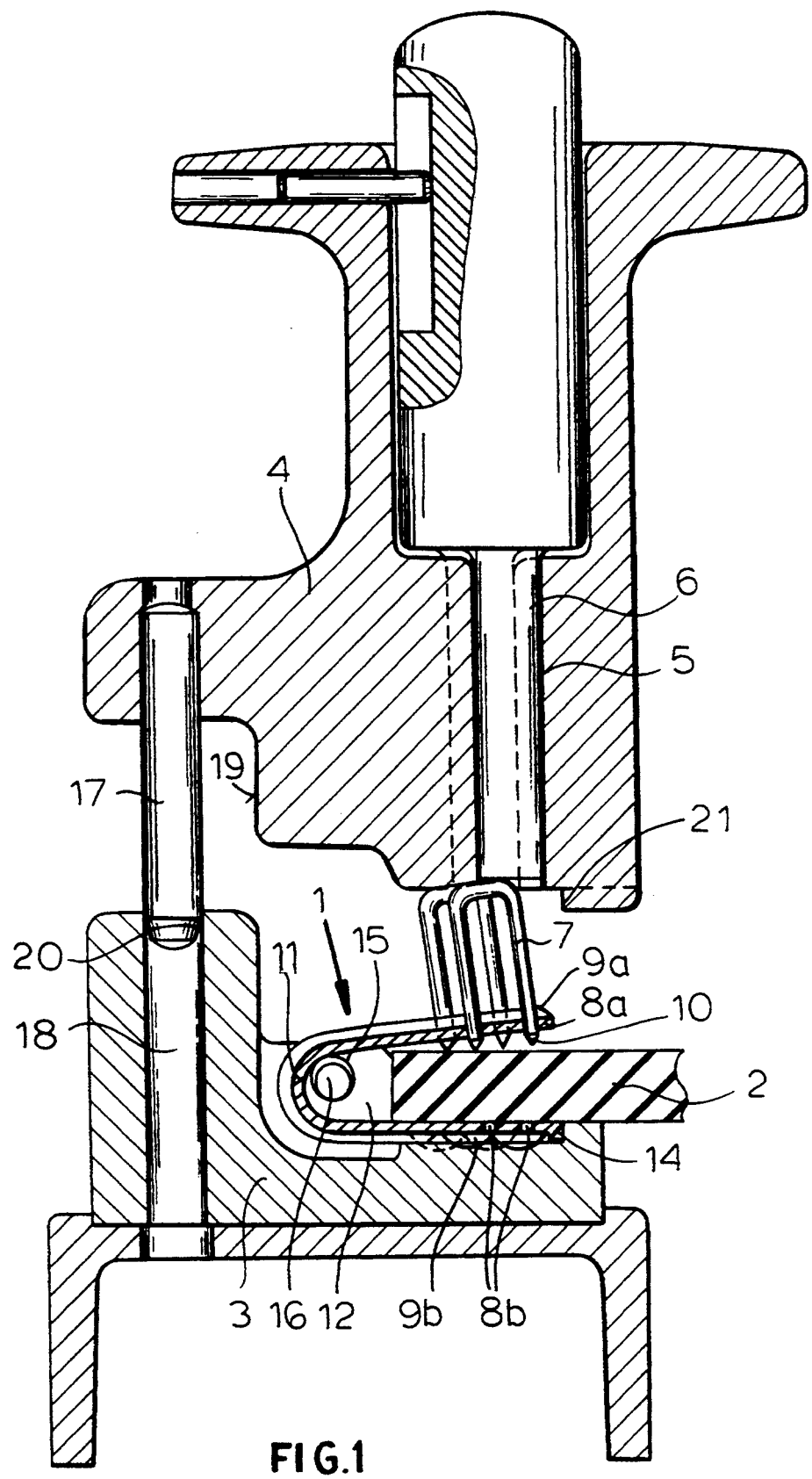
FIG. 1 is a vertical section through the stapler of this invention during the first step of a stapling operation.
Figure 7:
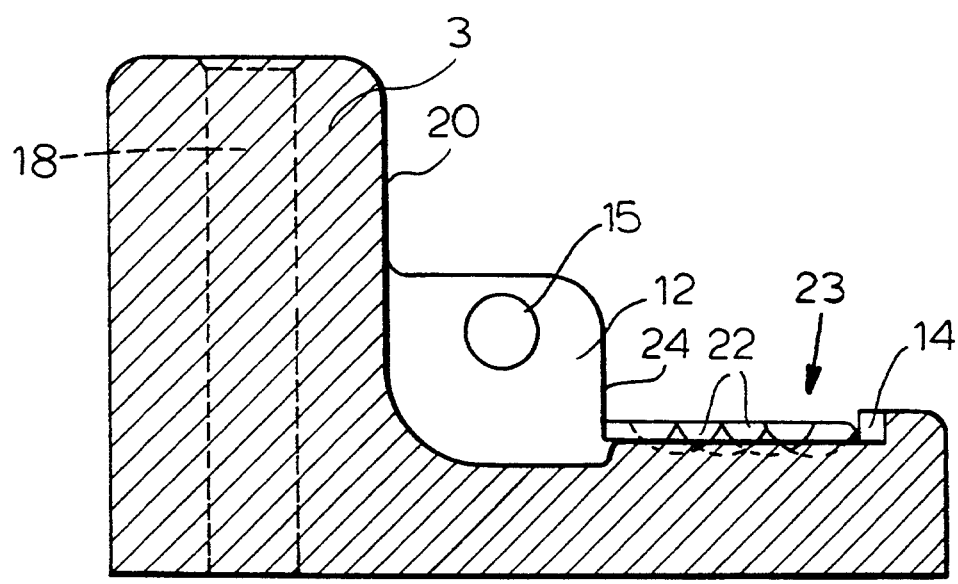
FIG. 7 is a vertical section through the lower stapler part.
Figure 8:
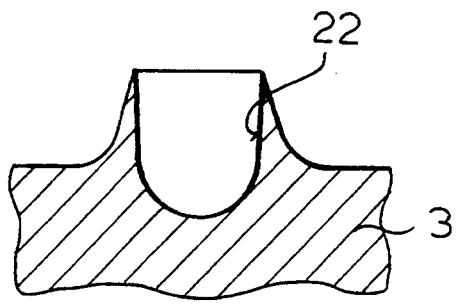
FIGS. 8 and 9 are sections taken respectively along lines VIII—VIII and IX—IX of FIG. 6.
Figure 9:
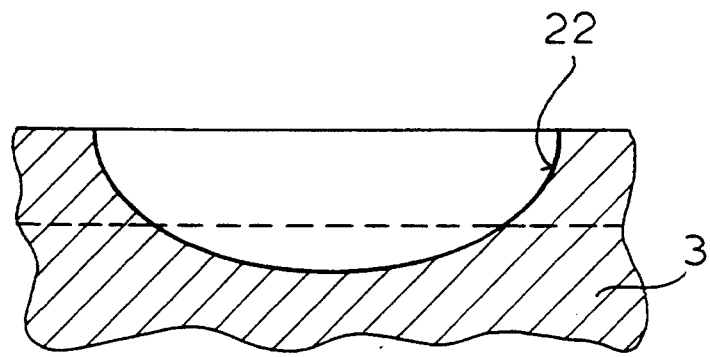

As seen in FIG. 1 a splice or connector clip 1 according to this invention is fastened to both sides of a belt end 2 so as to allow two such belt ends to be connected together as described in the above-cited patent documents. The apparatus basically comprises a lower die part 3 and an upper presser part 4, the latter formed with a vertical passage 5 slidably receiving a plunger 6 and the former with a seat 23 (FIG. 7). The system is intended to press staples 7 through holes 8a and 8b in upper and lower shanks or legs 9a and 9b of the clip 1. The clip 1 also has a bight including a pair of bight portions 11 that form a space 25 and that in the finished assembly are interleaved with other such bight portions.

Figure 10:
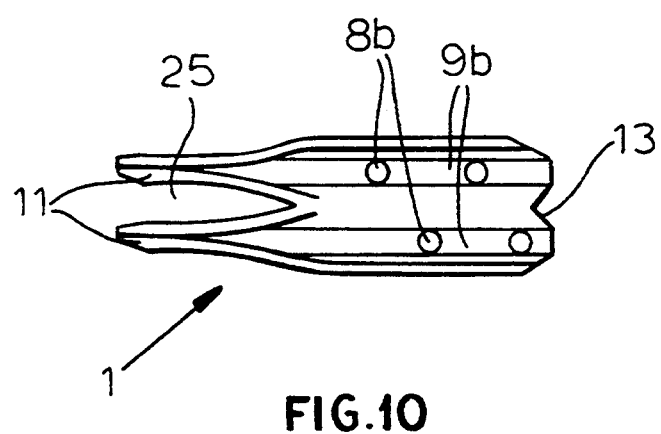
FIG. 10 is a bottom view of one of the clips of the system of this invention.

In order to accurately position the clip, the die part 3 is formed with upstanding guide webs 12 that fit between the bight portions 11, and with a centering wedge 14 that fits into a rearwardly open right-angle notch 13 (See FIG. 10) formed in the rear end of the clip 1. Thus the lower leg 9b will be accurately and immovably positioned in the die part 3 and the belt end 2 can butt against edges 24 of these webs 12. In addition the webs 12 are formed with aligned holes 15 through which a centering pin 16 can be inserted to pass through the bights 11 and hold the clips 1 in the lower die part 3 against any significant movement.

The upper presser part 4 is provided with vertically extending guide pins 17 that can slide vertically in holes 18 formed in the lower die part 3 to ensure perfect alignment of the plunger 6 with the staples 7 that are normally inserted in the holes 8a of the top leg 9a of the staple 7 before the clip 1 and belt end 2 are fitted to the stapler. When the pins 17 are engaged in the guide holes 18, flat complementary surfaces 19 and 20 of the parts 4 and 3, respectively, can slide on each other, as these surfaces 19 and 20 are parallel to a plane defined by the axes of the holes 18. Furthermore the presser part 4 has a ledge or shoulder 21 that can engage as described below with the outer or rear edge of the upper clip leg 9a. The passage 5 of the upper part 4 is shaped to receive the staples 7, having the same layout as the holes 8a and 8b. In addition the floor of each seat 23 is formed under each staple prong with a curved recess 22 so that as tips 10 of the staples 7 are driven into them, these tips 10 are bent side-ways and crimped.

The system is used as follows:

To start with the clips 1, whose pairs of upper holes 8a have been fitted with two respective staples 7, are fitted to the lower part 3, with the guide webs 12 engaged between the bight portions 11 and the guide wedges 14 in the notches 13. The pin 16 is inserted to stabilize the clips 1, ensuring that the lower legs 9b are perfectly positioned in the die part 3. This is the position of FIG. 1.

Figure 2:
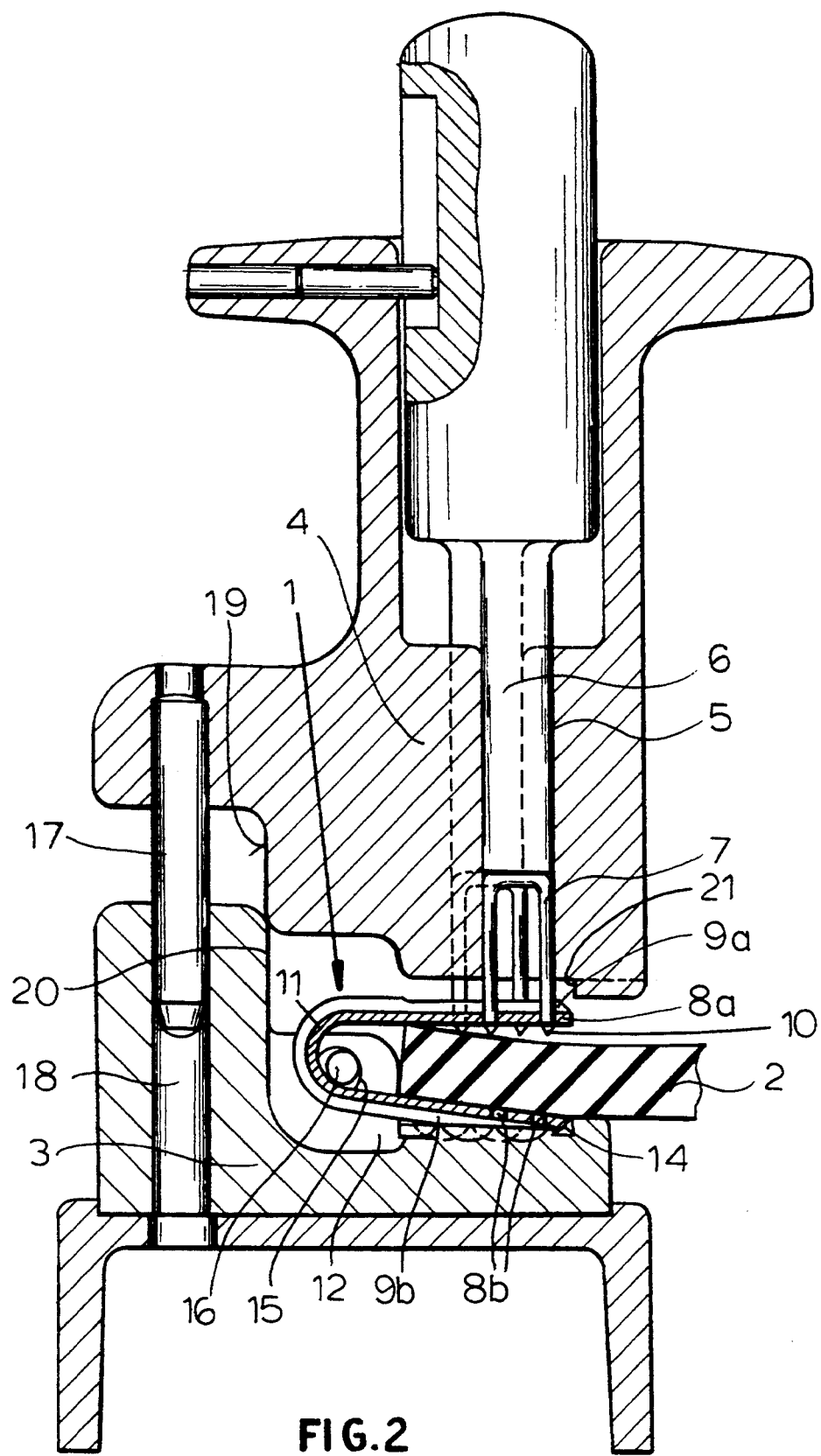
FIGS. 2, 3, and 4 are sections like FIG. 1 showing subsequent steps of the stapling operation.

Then as shown in FIG. 2 the upper part 4 is pushed down, which action levers up the lower leg 9b slightly and causes the staples 7 to fit into the passage 5. As the part 4 continues to descend, the plunger 6 is pushed up by the staples 7.

Figure 3:
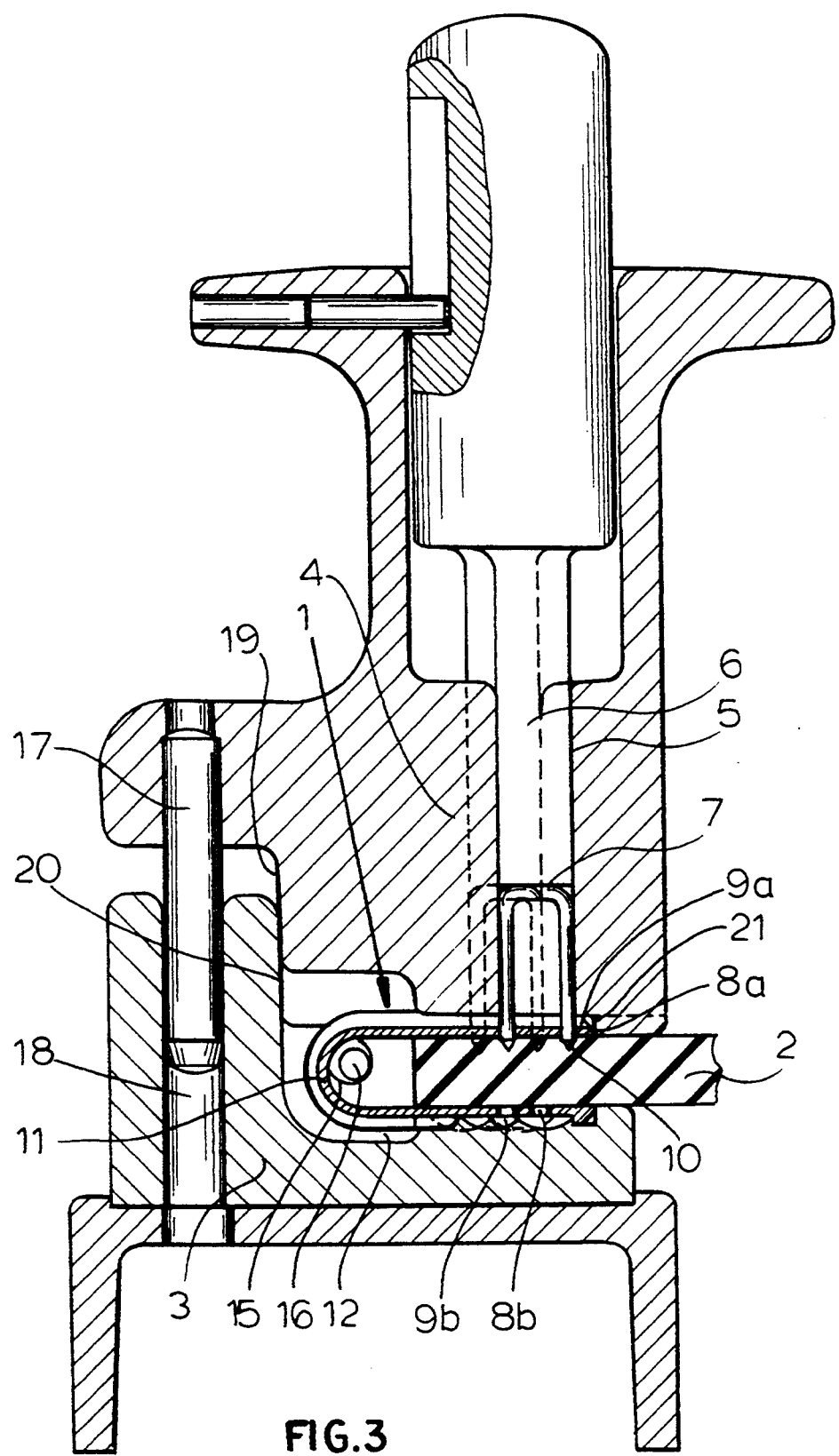

When the plunger 6 comes to its top-end position as shown in FIG. 3, the bottom face of the presser part 4 abuts flatly on the top leg 9a, fitting its outer end snugly to the shoulder 21 and setting the two legs 9a and 9b exactly parallel to each other and setting the staples 7 perpendicular to them.

Figure 4:
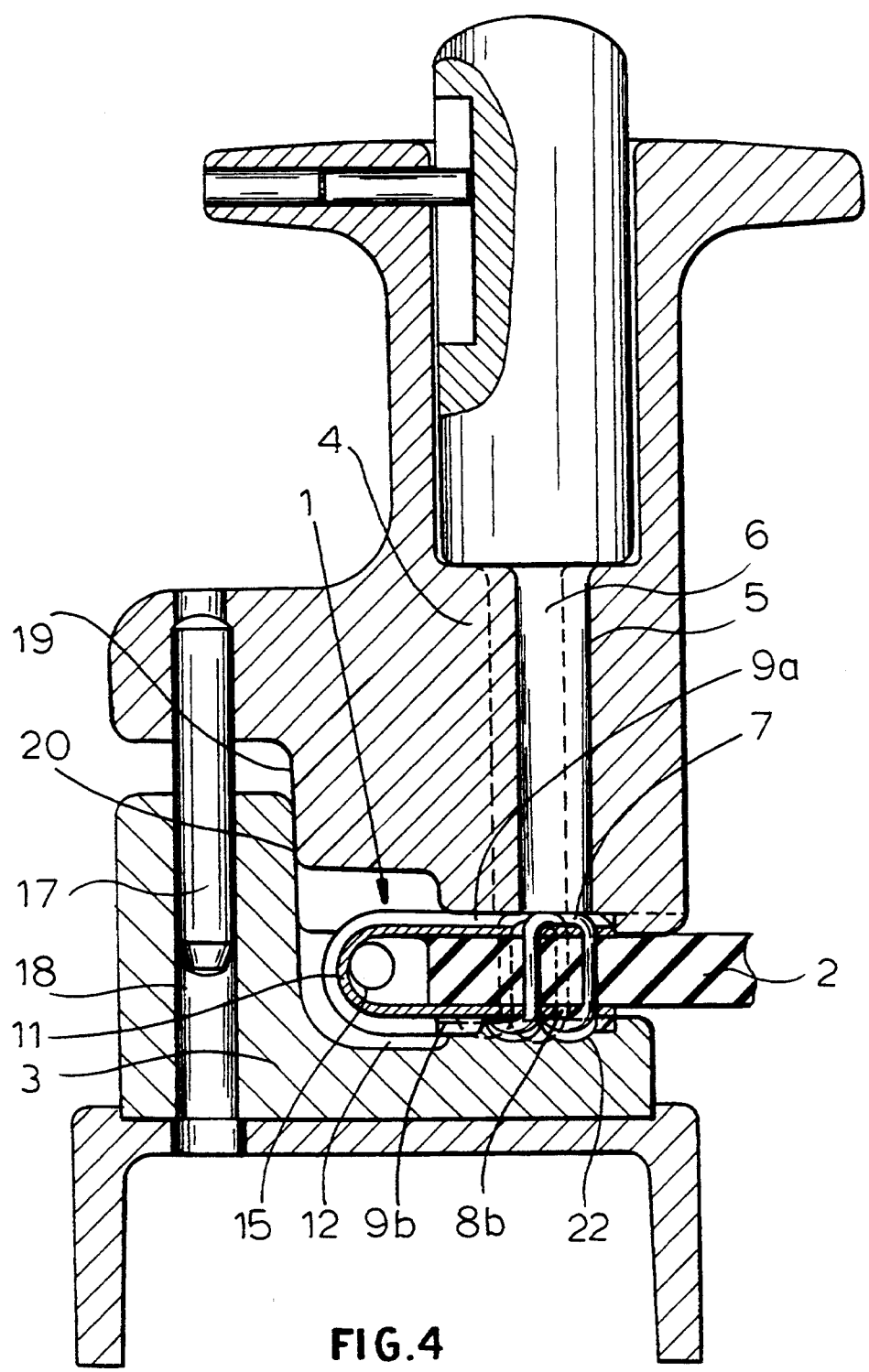
Figure 5:
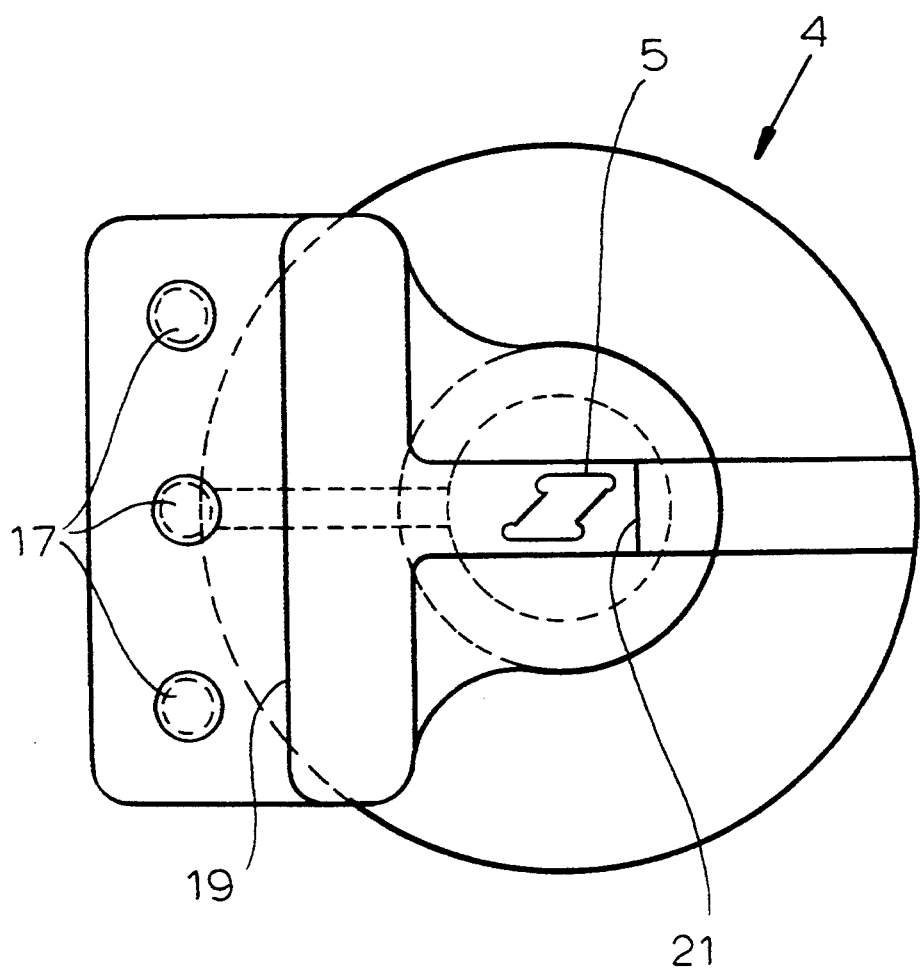
FIG. 5 is a bottom view of the upper part of the stapler.
Figure 6:
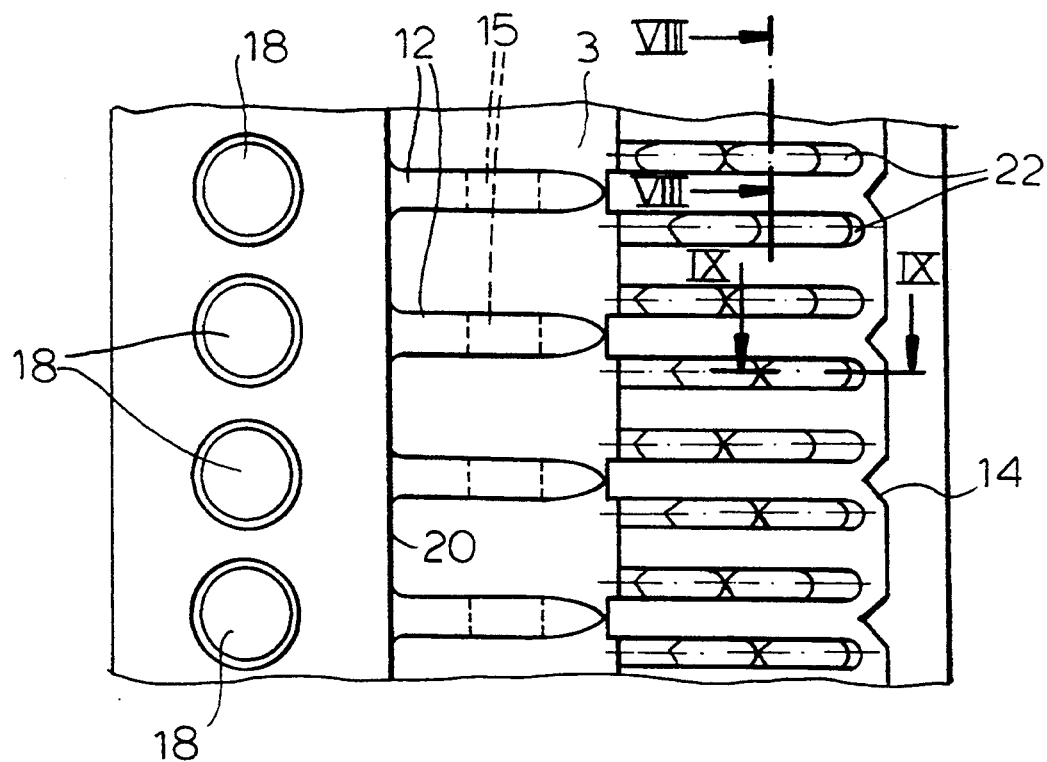
FIG. 6 is a top view of the lower part of the stapler.

Further depression of the plunger 6 then forces the staples 7 through the belt end 2 as shown in FIG. 4. Due to the exact positioning of the legs 9a and 9b and of the staples 7, these staples 7 will pass perfectly perpendicularly through the belt end and through the lower holes 8b. When the staple points 10 engage the recesses 22 in the seat 23 of the part 3, they will be bent over and crimped.

The presser part 4 can then be lifted up, shifted to the next adjacent clip 1, and the cycle repeated to staple it in place.

I claim:

1. In combination with:

at least one U-shaped clip having
 a pair of elongated legs each formed with at least two holes and having a rear edge formed with a rearwardly open notch, and
 a bight joining front ends of the legs; and
at least one staple having two prongs, a stapling apparatus comprising:
 a die part having a seat shaped to fit one of the legs and having at a forward portion of the seat an upstanding guide web snugly engageable with the bight of the clip whose one leg is fitted in the seat and a forwardly pointing centering wedge in the seat and spaced rearwardly from the web and engageable in the notch of the clip;
 a presser part displaceable toward and away from the die part and having a passage extending toward the die part and in which a staple, which is engaged in the holes of the other leg of the clip, fits complementarily, the presser part having a lower surface formed with a shoulder complementarily engageable with the rear edge of the other leg of the clip fitted in the seat; and
 a plunger displaceable toward and away from the die part in the passage of the presser part, whereby when the clip is fitted over a belt end and to the die part and the presser part is pressed toward the die part such that the pair of legs of the clip are parallel to each other, depression of the plunger forces the staple through the belt end through both legs of the clip.

2. The stapling apparatus defined in claim 1 wherein the die part has a plurality of the seats, webs, and wedges, the webs being formed with holes aligned with each other and with the bights of a plurality of the clips in the seats, the apparatus further comprising
a centering pin engageable through the holes and between the legs of the clips at the bights of the clips.

3. The stapling apparatus defined in claim 2 wherein the webs have rear edges forming a stop for the belt end.

4. The stapling apparatus defined in claim 1 wherein the bight of the clip has two bight portions defining a forwardly open space, the web fitting complementarily into the space when the clip is fitted to the seat.

5. The stapling apparatus defined in claim 1 wherein the die part is formed with at least one guide hole extending perpendicular to the seat, the presser part having a guide pin slidably disposed in the guide hole.

* * * * *